(12) United States Patent
Moroo et al.

(10) Patent No.: US 8,442,312 B2
(45) Date of Patent: May 14, 2013

(54) METHOD AND APPARATUS FOR DETECTING IMAGE AREA, AND COMPUTER PRODUCT

(75) Inventors: Jun Moroo, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1457 days.

(21) Appl. No.: 11/322,127

(22) Filed: Dec. 30, 2005

(65) Prior Publication Data

US 2006/0274339 A1 Dec. 7, 2006

(30) Foreign Application Priority Data

Jun. 1, 2005 (JP) ................................ 2005-161254

(51) Int. Cl.
G06K 9/00 (2006.01)

(52) U.S. Cl.
USPC ........... 382/167; 382/162; 382/165; 382/166; 358/1.9; 358/3.01; 358/538

(58) Field of Classification Search .................. 358/520, 358/518, 524, 539, 1.9, 523, 534, 525, 515, 358/296, 300, 500, 504, 1.1, 3.32, 2.1; 382/162, 382/165, 166, 167, 100, 163, 232, 274, 275, 382/30, 300, 293, 276; 348/606, 631, 653, 348/662, 663, 713, E9.047, 279, E9.04; 345/602, 345/603, 604, 600, 594, 590, 601, 609, 589, 345/77

See application file for complete search history.

(56) References Cited

U.S. PATENT DOCUMENTS

| | | | |
|---|---|---|---|
| 4,335,398 A | | 6/1982 | Yamada |
| 5,657,137 A | * | 8/1997 | Perumal et al. ............... 358/502 |
| 5,917,994 A | * | 6/1999 | Perumal et al. ............... 358/1.9 |
| 6,101,272 A | * | 8/2000 | Noguchi ....................... 382/167 |
| 7,034,844 B2 | * | 4/2006 | Akiyama et al. .............. 345/590 |
| 7,221,791 B2 | * | 5/2007 | Kagawa et al. ............... 382/167 |
| 7,523,311 B1 | * | 4/2009 | Matsui .......................... 713/176 |
| 7,688,489 B2 | * | 3/2010 | Nagoshi et al. ............... 358/520 |
| 2003/0169438 A1 | * | 9/2003 | Velde et al. .................... 358/1.9 |
| 2005/0004989 A1 | * | 1/2005 | Satterfield et al. ........... 709/206 |
| 2005/0226534 A1 | | 10/2005 | Moroo et al. |

FOREIGN PATENT DOCUMENTS

| | | |
|---|---|---|
| EP | 1 315 366 | 5/2003 |
| EP | 1 480 163 | 11/2004 |
| JP | 07-023210 | 1/1995 |
| JP | HEI07-23210 A | 1/1995 |
| JP | 7-254037 | 10/1995 |

(Continued)

OTHER PUBLICATIONS

Office Action issued in corresponding Japanese Patent Application No. 2005-161254, mailed on Sep. 25, 2007.

*Primary Examiner* — Mekkonen Bekele
(74) *Attorney, Agent, or Firm* — Fujitsu Patent Center

(57) ABSTRACT

An apparatus detects an area specified based on a mark of a specific color out of three primary colors in pigment or three primary colors in light from an image. An other-color-information eliminating unit eliminates information of other colors from a tone level of the specific color by correcting the tone level of the specific color based on tone levels of two colors other than the specific color out of the three primary colors in pigment or the three primary colors in light. An area detecting unit detects the area by specifying the mark based on the tone level from which the information of other colors is eliminated.

13 Claims, 7 Drawing Sheets

FOREIGN PATENT DOCUMENTS

| | | |
|---|---|---|
| JP | HEI07-254037 A | 10/1995 |
| JP | 09-18707 | 1/1997 |
| JP | HEI09-18707 A | 1/1997 |
| JP | 11-75053 | 3/1999 |
| JP | 2000-306094 | 11/2000 |
| JP | 2000-306094 A | 11/2000 |
| JP | 2001-36733 | 2/2001 |
| JP | 2001-36733 A | 2/2001 |
| JP | 2001-36741 | 2/2001 |
| JP | 200136733 A * | 2/2001 |
| JP | 2001036733 A * | 2/2001 |
| JP | 2002-216119 | 8/2002 |
| JP | 2002-216119 A | 8/2002 |
| JP | 2003-348340 | 12/2003 |
| JP | 2004-110116 | 4/2004 |
| JP | 2004-110116 A | 4/2004 |
| JP | 2004-349879 | 12/2004 |
| JP | 2004-349879 A | 12/2004 |

\* cited by examiner

FIG.3

| COLOR | R | G | B |
|---|---|---|---|
| YELLOW (Y) | 255 | 255 | 0 |
| MAGENTA (M) | 255 | 0 | 255 |
| CYAN (C) | 0 | 255 | 255 |
| RED (R) | 255 | 0 | 0 |
| GREEN (G) | 0 | 255 | 0 |
| BLUE (B) | 0 | 0 | 255 |
| BLACK | 0 | 0 | 0 |

ORIGINAL IMAGE          RESULT OF SEPARATION

METHOD AND APPARATUS FOR DETECTING IMAGE AREA, AND COMPUTER PRODUCT

BACKGROUND OF THE INVENTION

1. Field of the Invention

The present invention relates to a technology for detecting an area specified based on a mark of a specific color out of three primary colors from a printed image.

2. Description of the Related Art

Recently, an electronic watermark technique of embedding invisible data into image data has been actively developed. For example, Japanese Patent Application Laid-Open No. 2004-349879 describes a technique of dividing image data into plural blocks, and embedding plural codes into the blocks by relating one code to each block based on a magnitude relation of characteristics of the block such as average concentration of the block.

A technique of embedding data into printed or displayed image and using the image is also being developed. For example, when a uniform resource locator (URL) is embedded into a printed image, a user can fetch the printed image with an imaging device installed in a portable telephone to extract the URL, thereby automatically accessing a web page by using the extracted URL.

To fetch data from the image, it is necessary to specify an area of the image where the data is embedded. For specifying an image area, a technique of embedding a square mark into the printed image to specify a data-embedded area is developed (see, for example, Japanese Patent Application Laid-Open No. H7-254037).

Japanese Patent Application Laid-Open No. H9-018707 discloses a technique of embedding a yellow mark into a printed image to make the embedded mark not easily noticeable. Japanese Patent Application No. 2004-110116 describes a mark that is designed not to be affected by variation in the size of an image picked up with an imaging device.

However, when a background color of the mark is not constant, and when a character or a line in another color is present around the mark or on the mark, detection of the mark becomes difficult. To facilitate the detection of the mark, a technique of separating a specific color area from the image area is developed (see, for example, Japanese Patent Application Laid-Open No. 2002-216119).

However, the conventional techniques require an enormous calculation for color space conversion for each pixel when separating a specific color area.

SUMMARY OF THE INVENTION

It is an object of the present invention to at least solve the problems in the conventional technology.

An apparatus according to one aspect of the present invention detects an area specified based on a mark of a specific color out of three primary colors in pigment or three primary colors in light from an image. The apparatus includes an other-color-information eliminating unit that eliminates information of other colors from a tone level of the specific color by correcting the tone level of the specific color based on tone levels of two colors other than the specific color out of the three primary colors in pigment or the three primary colors in light; and an area detecting unit that detects the area by specifying the mark based on the tone level from which the information of other colors is eliminated.

A method according to another aspect of the present invention is for detecting an area specified based on a mark of a specific color out of three primary colors in pigment or three primary colors in light from an image. The method includes eliminating information of other colors from a tone level of the specific color by correcting the tone level of the specific color based on tone levels of two colors other than the specific color out of the three primary colors in pigment or the three primary colors in light; and detecting the area by specifying the mark based on the tone level from which the information of other colors is eliminated.

A computer-readable recording medium according to still another aspect of the present invention stores a computer program for realizing the above method according to the present invention on a computer.

A printed medium according to still another aspect of the present invention has an image printed thereon. An area, which is specified based on a mark of a specific color out of three primary colors in pigment or three primary colors in light, is arranged in a detectable manner in the image. The area can be detected by specifying the mark based on a tone level of the specific color from which information of other colors is eliminated by correcting the tone level of the specific color based on tone levels of two colors other than the specific color out of three primary colors in pigment or three primary colors in light. An image data is divided into a plurality of blocks at a position related to the mark. A code is embedded in each pair of blocks based on a magnitude relation of a feature amount in each of the blocks.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table of three primary colors (yellow, magenta, and cyan) in pigment, three primary colors (red, green, and blue) in light, and an RGB value of black;

DETAILED DESCRIPTION OF THE PREFERRED EMBODIMENTS

Exemplary embodiments of the present invention are explained in detail below with reference to the accompanying drawings.

Figure 1:
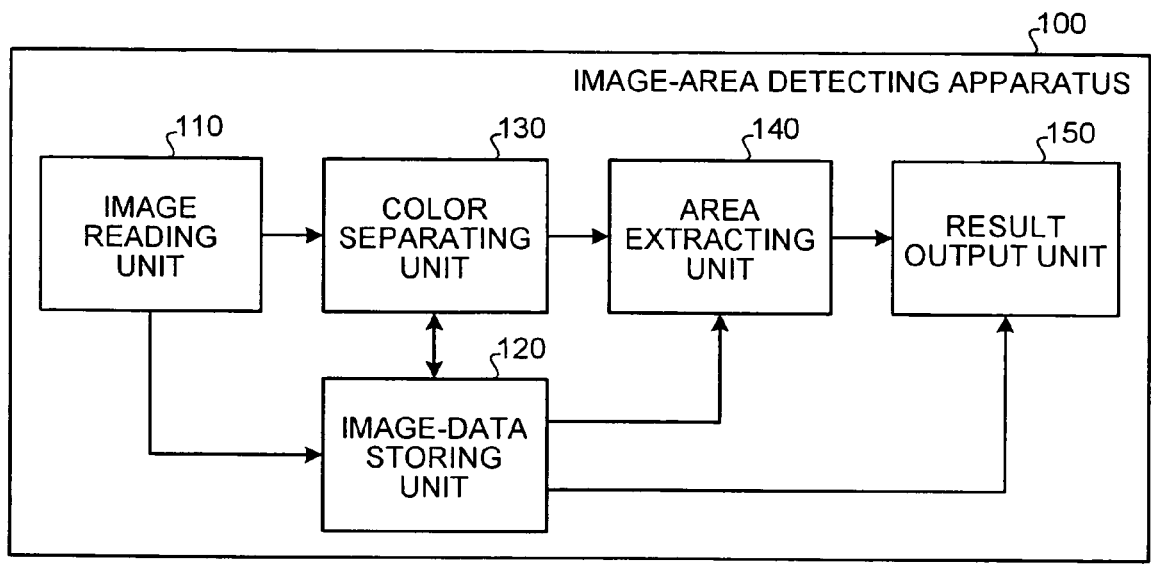
FIG. 1 is a functional block diagram of an image-area detecting apparatus according to an embodiment of the present invention.

FIG. 1 is a functional block diagram of an image-area detecting apparatus 100 according to an embodiment of the present invention. The image-area detecting apparatus 100 includes an image reading unit 110, an image-data storing unit 120, a color separating unit 130, an area extracting unit 140, and a result output unit 150.

The image reading unit 110 is a processor that reads a printed image with a color imaging device, and stores image data of the read printed image into the image-data storing unit 120. The image-data storing unit 120 stores-the image data of the printed image read by the image reading unit 110. The image-data storing unit 120 stores values of R, G, and B of each pixel.

The color separating unit 130 is a processor that separates yellow color from the image data stored in the image-data storing unit 120, and stores the separated result into the image-data storing unit 120. Specifically, the color separating unit 130 calculates $$B'=B+(255\text{-min }(R, G))$$

using values of R, G, and B that are stored in the image-data storing unit 120. When the value of B' exceeds "255", the color separating unit 130 clips "255", and stores a result into the image-data storing unit 120. Details of the color separating unit 130 are explained later.

In this example, a tone level of black (darkest color) is "0", and a tone level of white (brightest color) is "255". When the tone level of black (darkest color) is "255", and the tone level of white (brightest color) is "0", the color separating unit 130 calculates $$B'=B\text{-max }(R, G)$$

and when the value of B' is smaller than "0", the color separating unit 130 clips "0", and stores the result into the image-data storing unit 120.

The area extracting unit 140 is a processor that specifies a yellow mark using the image data from which the yellow color is separated by the color separating unit 130, and that extracts an area in which the data is embedded. The area extracting unit 140 sends the extracted result to the result output unit 150. Specifically, the area extracting unit 140 specifies the yellow mark using the value of B' calculated by the color separating unit 130. The result output unit 150 is a processor that outputs the image data of the area extracted by the area extracting unit 140 to extract the data.

Figure 2:
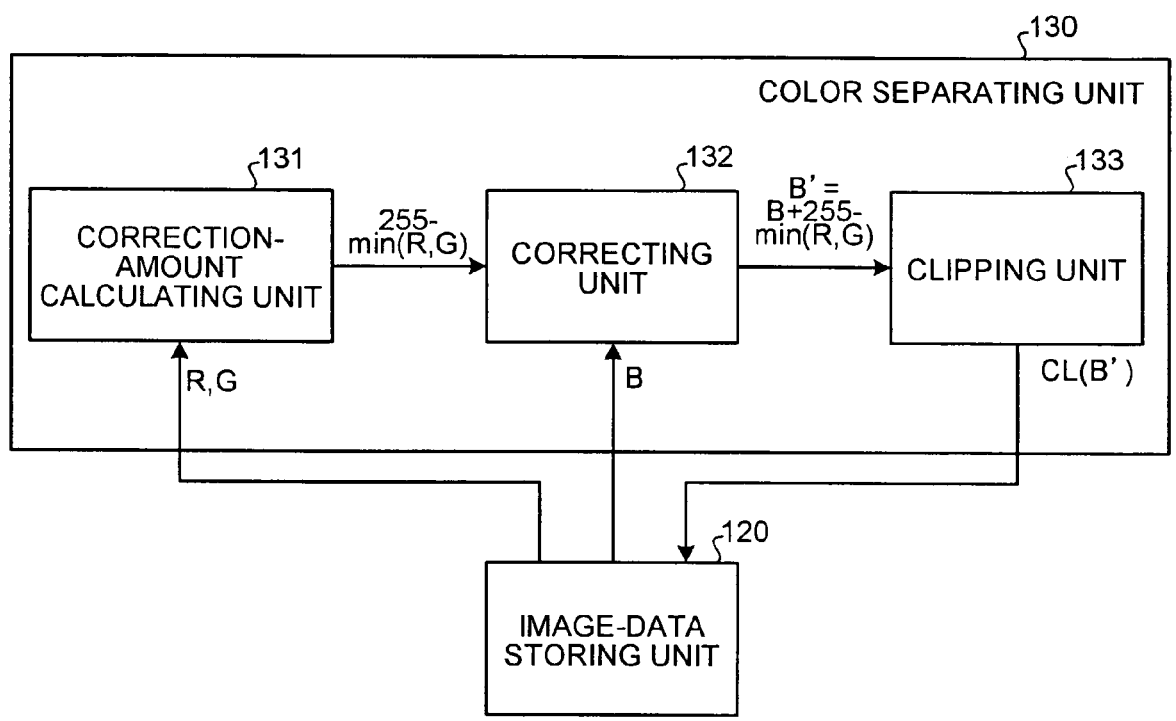
FIG. 2 is a functional block diagram of a color separating unit of the image-area detecting apparatus.

FIG. 2 is a functional block diagram of the color separating unit 130. The color separating unit 130 has a correction-amount calculating unit 131, a correcting unit 132, and a clipping unit 133.

The correction-amount calculating unit 131 is a processor that calculates 255-min (R, G) as a value to be added to B of each pixel. In other words, the correction-amount calculating unit 131 reads the values of R and G for each pixel from the image-data storing unit 120, compares the value of R with the value of G, subtracts a smaller value from 255, thereby calculating the value to be added.

The correcting unit 132 is a processor that adds the value calculated by the correction-amount calculating unit 131 to the value of B of each pixel. In other words, the correcting unit 132 reads the value of B for each pixel from the image-data storing unit 120, and adds 255-min (R, G) calculated by the correction-amount calculating unit 131, thereby calculating B'.

The clipping unit 133 is a processor that clips the value of B' calculated by the correcting unit 132, to within "255". In other words, the clipping unit 133 calculates CL(B'), in which CL(x) is a function of clipping x to "255" or below.

FIG. 3 is a table of three primary colors (yellow, magenta, and cyan) in pigment, three primary colors (red, green, and blue) in light, and an RGB value of black.

As shown in FIG. 3, a value of blue (B) as a complementary color of yellow is "0", and values of R and G as complementary colors of yellow are "255". Red, green, and black also make the value of B "0". When 255-min (R, G) is added to the value of B, the information of red, green, and black can be eliminated from the plane of B.

The above is specifically explained taking examples of numerical values. For yellow, the values of R, G, and B are "255", "255", and "0" respectively. When R and G are compared, "255" is smaller. Therefore, "255" is subtracted from "255" to obtain "0". This value is added to B(0) obtain "0". This shows yellow color that is the same as the original color. Assume that R, G, and B have values "200", "190", and "70". When R(200) is compared with G(190), G has a smaller value. Therefore, the value "190" is selected. This "190" is subtracted from "255" to obtain "65". This value is added to B(70) to obtain "135". This "135" shows a separated color.

For an achromatic color, for example, assume that R, G, and B take values of "128", "128", and "128" respectively. When R and G are compared, a smaller value is "128". Therefore, "1128" is subtracted from "255" to obtain "127". This value is added to B(128) to obtain "255", and shows white.

For red, the values of R, G, and B are "255", "0", and "0" respectively. When R and G are compared, "0" is smaller. Therefore, "0" is subtracted from "255" to obtain "255". This value is added to B(0) to obtain "255", and shows white.

For magenta, the values of R, G, and B are "255", "0", and "255" respectively. When R and G are compared, "0" is smaller. Therefore, "0" is subtracted from "255" to obtain "255". This value is added to B(255) to obtain "510". Since "510" is larger than "255", "255" is clipped to obtain "255".

As explained above, B'=B+(255-min (R, G)) is calculated, and is clipped to become equal to or below "255". With this arrangement, information other than yellow is eliminated from the plane of B, thereby separating yellow from the plane of B. In other words, data of yellow is separated and formed as a value smaller than 255 on the plane of B.

Figure 4:
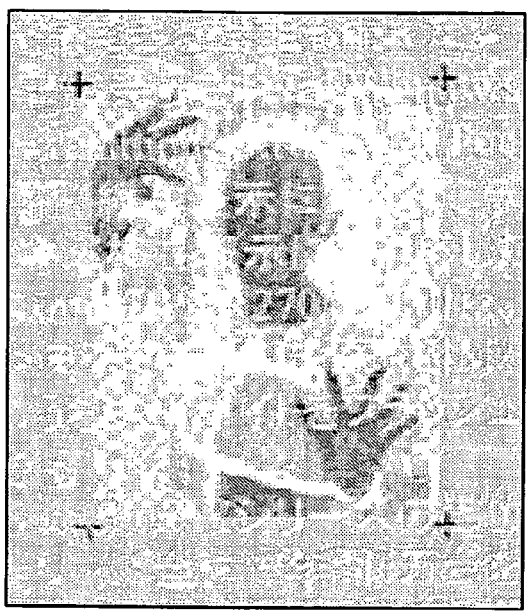
FIG. 4 is an example of a color separation by the color separating unit.

FIG. 4 is an example of a color separation by the color separating unit 130, showing a result of separating yellow from a color picture. In this example, "+" in the image as a result of the color separation shows an area where data is embedded. The data is embedded in an image area encircled by four "+".

Figure 5:
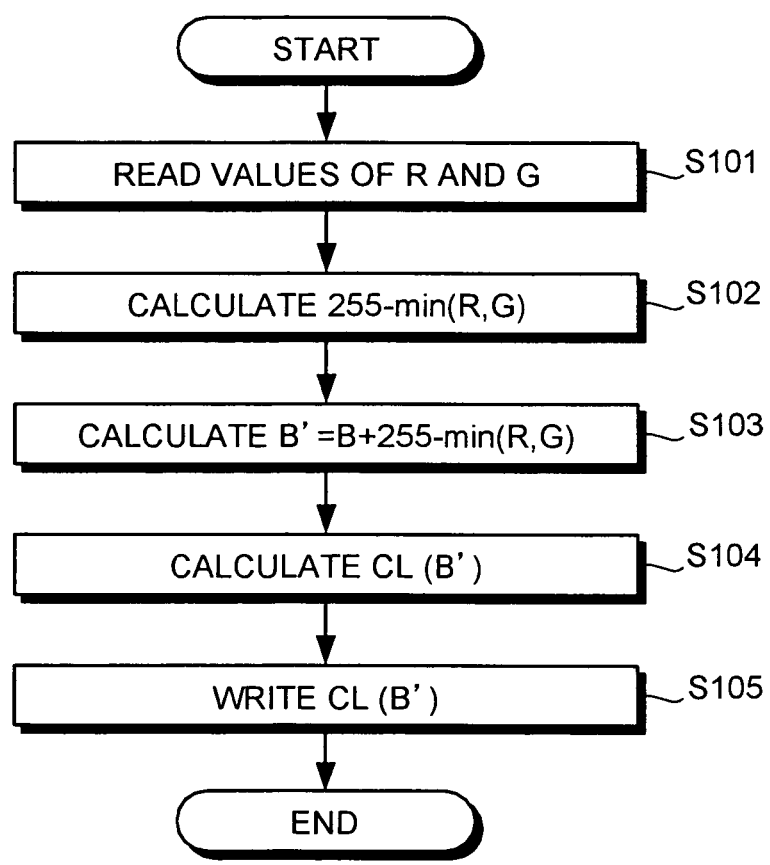
FIG. 5 is a flowchart of a processing procedure for a color separating process performed by the color separating unit with respect to each pixel.

FIG. 5 is a flowchart of a processing procedure for a color separating process performed by the color separating unit 130 with respect to each pixel.

As shown in FIG. 5, the correction-amount calculating unit 131 of the color separating unit 130 reads the values of R and G from the image-data storing unit 120 (step S101), and calculates a value to be added to B, that is, 255-min (R, G) to remove the information of colors other than yellow (step S102).

The correcting unit 132 then reads the value of B from the image-data storing unit 120, and adds 255-min (R, G) calculated by the correction-amount calculating unit 131 to the value of B to calculate B'=B+255-min (R, G) (step S103). The clipping unit 133 clips B+255-min (R, G) to 255 or below to calculate CL(B') (step S104), and stores CL(B') into the image-data storing unit 120 (step S105).

Thus, the correction-amount calculating unit 131 can calculate a value to be added to B to remove the information of colors other than yellow. The correcting unit 132 can correct the value of B, and remove the information of colors other than yellow, thereby separating yellow.

According to the present embodiment, an example of using the value of R or G to calculate the value to be added to B to remove the information of colors other than yellow is explained. However, depending on the characteristics of a device that reads a printed image, it is necessary to control the influence of R or G. A color separating unit that can control the influence of R or G at the time of calculating the value to be added to B to remove the information of colors other than yellow is explained below.

Figure 6:
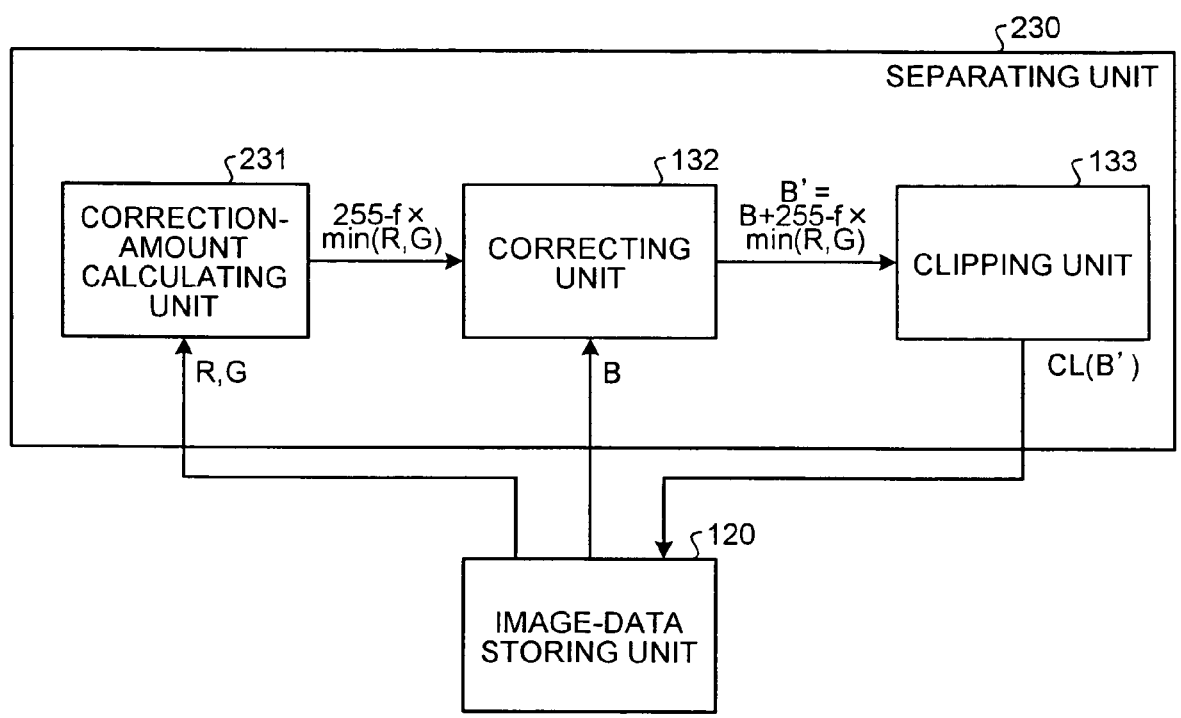
FIG. 6 is a functional block diagram of a color separating unit capable of controlling an influence of R or G.

FIG. 6 is a functional block diagram of a color separating unit 230 capable of controlling an influence of R or G. For convenience sake, like reference numerals designate like functional units that function similarly to those of the units shown in FIG. 2, and their detailed explanation is omitted.

As shown in FIG. 6, the color separating unit 230 includes a correction-amount calculating unit 231, instead of the correction-amount calculating unit 131 included in the color separating unit 130 shown in FIG. 2. The correction-amount calculating unit 231 calculates 255-fxmin (R, G), in which f represents a coefficient having a constant value, or a function of a value of any one of R, G, and B.

As explained above, the correction-amount calculating unit 231 multiplies a coefficient to the value of R or G whichever is smaller to control the influence of R or G, thereby correcting the value of B.

According to the present embodiment, the correction-amount calculating unit 131 calculates the value to be added to B, that is, 255-min (R, G), to remove the information of colors other than yellow. The correcting unit 132 corrects the value of B to calculate B'=B+255-min (R, G). The clipping unit 133 clips the value of B' to "255" or below, thereby removing the information of colors other than yellow from B, and separating yellow.

When the configuration of the image-area detecting apparatus is realized by software, an image-area detecting program having similar functions can be obtained. A computer that executes this image-area detecting program is explained below.

Figure 7:
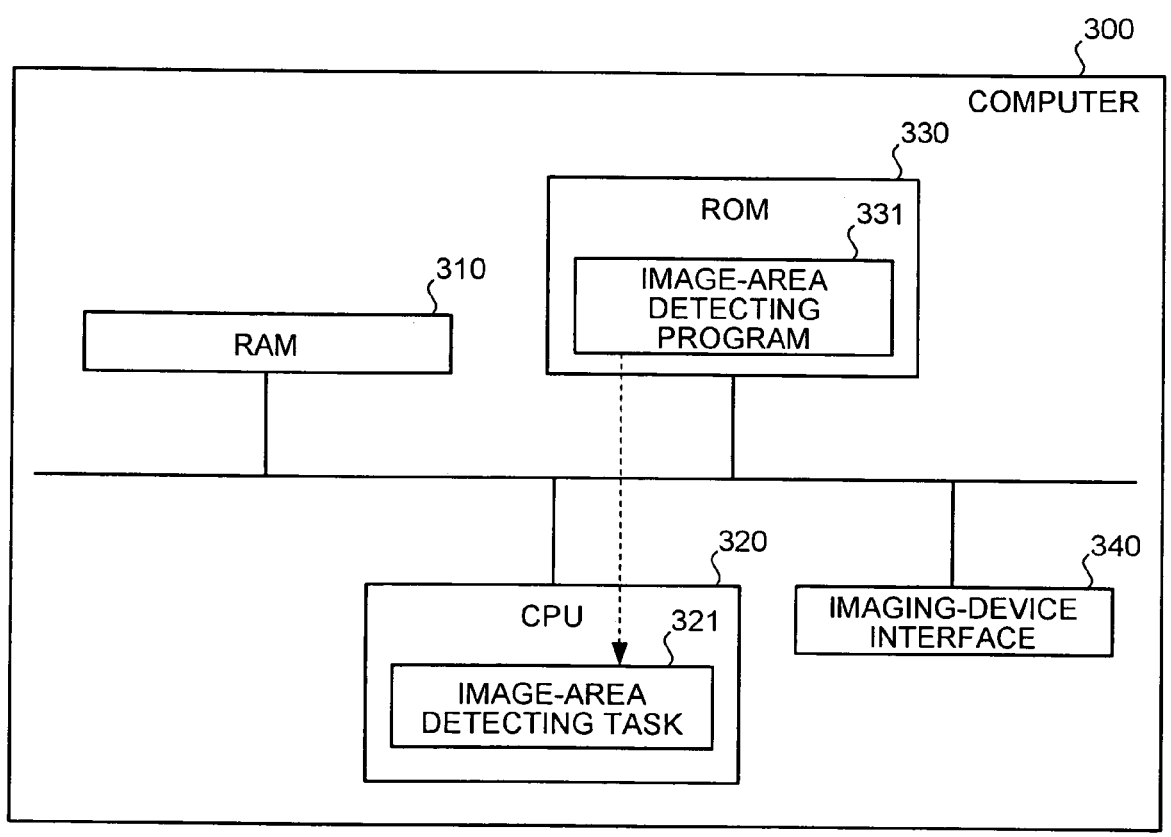
FIG. 7 is a functional block diagram of a computer that executes an image-area detecting program according to the present embodiment.

FIG. 7 is a functional block diagram of a computer 300 that executes an image-area detecting program according to the present embodiment. The computer 300 includes a random access memory (RAM) 310, a central processing unit (CPU) 320, a read only memory (ROM) 330, and an imaging-device interface 340.

The RAM 310 is a memory that stores image data and an interim result of executing an image-area detecting program 331. The CPU 320 is a central processing unit that reads the image-area detecting program 331 from the ROM 330, and executes an image area detecting task 321.

The ROM 330 stores the image-area detecting program 331, and data. The imaging-device interface 340 inputs data of a printed image read by the imaging device.

While the detection of a yellow mark is explained in the present embodiment, the present invention is not limited to the detection of a yellow mark. The present invention can be also applied to a detection of a magenta or cyan mark. When a relationship of complementary colors is used, the present invention can be also similarly applied to a detection of a red, blue, or green mark.

While the use of values of RGB as image data is explained in the present embodiment, the use is not limited to these values, and the present invention can be also similarly applied when values of YMC are used. In this case, information of colors other than yellow can be eliminated from Y by calculating $$Y'=Y-\max(M, C)$$

According to the present invention, an area can be detected by specifying a mark by easily separating a specific color, thereby facilitating the detection of an area.

Furthermore, according to the present invention, a mark can be specified easily, thereby facilitating the detection of an area.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus that detects an area specified based on a mark of a specific color out of three primary colors in pigment or three primary colors in light from an image, the apparatus comprising:
a color separating unit that separates the specific color by correcting a tone level of the specific color and tone levels of two colors based on the tone levels of the two colors, the two colors being two primary colors other than the specific color in pigment when the specific color is one out of three primary colors in pigment and the two colors being two primary colors other than the specific color in light when the specific color is one out of three primary colors in light; and
an area detecting unit that detects the area by specifying the mark based on the corrected tone level of the specific color separated by the color separating unit, wherein
a minimum value of the tone level corresponds to a value of a tone level of a darkest color, and a maximum value of the tone level corresponds to a value of a tone level of a brightest color, and
the color separating unit separates the specific color by adding a value obtained by subtracting a smaller value of a tone level out of tone levels of complementary colors of the two colors from the maximum value of the tone level, to a tone level of a complementary color of the specific color.

2. An apparatus that detects an area specified based on a mark of a specific color out of three primary colors in pigment or three primary colors in light from an image, the apparatus comprising:
a color separating unit that separates the specific color by correcting a tone level of the specific color and tone levels of two colors based on the tone levels of the two colors, the two colors being two primary colors other than the specific color in pigment when the specific color is one out of three primary colors in pigment and the two colors being two primary colors other than the specific color in light when the specific color is one out of three primary colors in light; and
an area detecting unit that detects the area by specifying the mark based on the corrected tone level of the specific color separated by the color separating unit, wherein
a minimum value of the tone level corresponds to a value of a tone level of a darkest color, and a maximum value of the tone level corresponds to a value of a tone level of a brightest color, and
the color separating unit separates the specific color by adding a value obtained by subtracting a smaller value of a tone level out of tone levels of complementary colors of the two colors multiplied by a predetermined coefficient from the maximum value of the tone level, to a tone level of a complementary color of the specific color.

3. The apparatus according to claim 1, wherein
the specific color is yellow,
the complementary color of the specific color is blue, and
the complementary colors of the two colors are red and green.

4. The apparatus according to claim 2, wherein
the specific color is yellow,
the complementary color of the specific color is blue, and the complementary colors of the two colors are red and green.

5. An apparatus that detects an area specified based on a mark of a specific color out of three primary colors in pigment or three primary colors in light from an image, the apparatus comprising:
- a color separating unit that separates the specific color by correcting a tone level of the specific color and tone levels of two colors based on the tone levels of the two colors, the two colors being two primary colors other than the specific color in pigment when the specific color is one out of three primary colors in pigment and the two colors being two primary colors other than the specific color in light when the specific color is one out of three primary colors in light; and
- an area detecting unit that detects the area by specifying the mark based on the corrected tone level of the specific color separated by the color separating unit, wherein
- a minimum value of the tone level corresponds to a value of a tone level of a darkest color, and a maximum value of the tone level corresponds to a value of a tone level of a brightest color, and
- the color separating unit separates the specific color by subtracting a larger value of a tone level out of tone levels of the two colors from the tone level of the specific color.

6. An apparatus that detects an area specified based on a mark of a specific color out of three primary colors in pigment or three primary colors in light from an image, the apparatus comprising:
- a color separating unit that separates the specific color by correcting a tone level of the specific color and tone levels of two colors based on the tone levels of the two colors, the two colors being two primary colors other than the specific color in pigment when the specific color is one out of three primary colors in pigment and the two colors being two primary colors other than the specific color in light when the specific color is one out of three primary colors in light; and
- an area detecting unit that detects the area by specifying the mark based on the corrected tone level of the specific color separated by the color separating unit, wherein
- a minimum value of the tone level corresponds to a value of a tone level of a darkest color, and a maximum value of the tone level corresponds to a value of a tone level of a brightest color, and
- the color separating unit separates the specific color by subtracting a value obtained by multiplying a larger value of a tone level out of tone levels of the two colors by a predetermined coefficient from the tone level of the specific color.

7. The image-area detecting apparatus according to claim 5, wherein
the specific color is yellow, and
the two colors are cyan and magenta.

8. The image-area detecting apparatus according to claim 6, wherein
the specific color is yellow, and
the two colors are cyan and magenta.

9. An apparatus that detects an area specified based on a mark of a specific color out of three primary colors in pigment or three primary colors in light from an image, the apparatus comprising:
- a color separating unit that separates the specific color by correcting a tone level of the specific color and tone levels of two colors based on the tone levels of the two colors, the two colors being two primary colors other than the specific color in pigment when the specific color is one out of three primary colors in pigment and the two colors being two primary colors other than the specific color in light when the specific color is one out of three primary colors in light; and
- an area detecting unit that detects the area by specifying the mark based on the corrected tone level of the specific color separated by the color separating unit, wherein
- a minimum value of the tone level corresponds to a value of a tone level of a brightest color, and a maximum value of the tone level corresponds to a value of a tone level of a darkest color, and
- the color separating unit separates the specific color by subtracting a larger value of a tone level out of tone levels of complementary colors of the two colors from a tone level of a complementary color of the specific color.

10. A method of detecting an area specified based on a mark of a specific color out of three primary colors in pigment or three primary colors in light from an image, the method comprising:
- separating, using a computer, the specific color by correcting the tone level of the specific color and tone levels of two colors based on the tone levels of the two colors, the two colors being two primary colors other than the specific color in pigment when the specific color is one out of three primary colors in pigment and the two colors being two primary colors other than the specific color in light when the specific color is one out of three primary colors in light; and
- detecting the area by specifying the mark based on the corrected tone level of the specific color separated at the separating, wherein
- a minimum value of the tone level corresponds to a value of a tone level of a darkest color, and a maximum value of the tone level corresponds to a value of a tone level of a brightest color, and
- the separating separates the specific color by adding a value obtained by subtracting a smaller value of a tone level out of tone levels of complementary colors of the two colors from the maximum value of the tone level, to a tone level of a complementary color of the specific color.

11. A non-transitory computer-readable recording medium that stores a computer program for detecting an area specified based on a mark of a specific color out of three primary colors in pigment or three primary colors in light from an image, wherein the computer program causes a computer to execute operations, the computer program causing the computer to perform operations comprising:
- separating the specific color by correcting the tone level of the specific color and tone levels of two colors based on the tone levels of the two colors, the two colors being two primary colors other than the specific color in pigment when the specific color is one out of three primary colors in pigment and the two colors being two primary colors other than the specific color in light when the specific color is one out of three primary colors in light; and
- detecting the area by specifying the mark based on the corrected tone level of the specific color separated at the separating, wherein
- a minimum value of the tone level corresponds to a value of a tone level of a darkest color, and a maximum value of the tone level corresponds to a value of a tone level of a brightest color, and
- the separating separates the specific color by adding a value obtained by subtracting a smaller value of a tone level out of tone levels of complementary colors of the two colors from the maximum value of the tone level, to a tone level of a complementary color of the specific color.

12. A method of detecting an area specified based on a mark of a specific color out of three primary colors in pigment or three primary colors in light from an image, the method comprising:

separating, using a computer, the specific color by correcting the tone level of the specific color and tone levels of two colors based on the tone levels of the two colors, the two colors being two primary colors other than the specific color in pigment when the specific color is one out of three primary colors in pigment and the two colors being two primary colors other than the specific color in light when the specific color is one out of three primary colors in light; and detecting the area by specifying the mark based on the corrected tone level of the specific color separated at the separating, wherein a minimum value of the tone level corresponds to a value of a tone level of a darkest color, and a maximum value of the tone level corresponds to a value of a tone level of a brightest color, and the separating separates the specific color by subtracting a larger value of a tone level out of tone levels of the two colors from the tone level of the specific color.

13. A non-transitory computer-readable recording medium that stores a computer program for detecting an area specified based on a mark of a specific color out of three primary colors in pigment or three primary colors in light from an image, wherein the computer program causes a computer to execute operations, the computer program causing the computer to perform operations comprising:

separating the specific color by correcting the tone level of the specific color and tone levels of two colors based on the tone levels of the two colors, the two colors being two primary colors other than the specific color in pigment when the specific color is one out of three primary colors in pigment and the two colors being two primary colors other than the specific color in light when the specific color is one out of three primary colors in light; and detecting the area by specifying the mark based on the corrected tone level of the specific color separated at the separating, wherein a minimum value of the tone level corresponds to a value of a tone level of a darkest color, and a maximum value of the tone level corresponds to a value of a tone level of a brightest color, and the separating separates the specific color by subtracting a larger value of a tone level out of tone levels of the two colors from the tone level of the specific color.

* * * * *